United States Patent [19]

Klotz

[11] Patent Number: 5,347,882
[45] Date of Patent: Sep. 20, 1994

[54] CABLE MOUNTING CONSTRUCTION

[75] Inventor: Steven H. Klotz, West Bloomfield, Mich.

[73] Assignee: FKI Industries Inc., Fairfield, Conn.

[21] Appl. No.: 117,722

[22] Filed: Sep. 7, 1993

[51] Int. Cl.⁵ .............................................. F16C 1/10
[52] U.S. Cl. ................................... 74/502.4; 74/502.6; 74/500.5; 74/501.5 R; 248/65; 248/68.1; 248/74.2
[58] Field of Search .............. 74/502.4, 502.6, 500.5, 74/491, 502, 503, 501.5 R; 248/65, 68.1, 74.2

[56] References Cited

U.S. PATENT DOCUMENTS

| | | | |
|---|---|---|---|
| 2,543,997 | 3/1951 | Vavra | 248/68 |
| 2,744,769 | 5/1956 | Roeder | 285/6.5 |
| 2,744,776 | 5/1956 | Brown | 287/20 |
| 2,954,248 | 9/1960 | Brickman | 287/20 |
| 3,229,026 | 1/1966 | Sulzer | 174/65 |
| 3,366,356 | 1/1968 | Fisher | 248/56 |
| 3,885,767 | 5/1975 | Olowinski | 248/204 |
| 4,267,994 | 5/1981 | Lynch | 248/65 |
| 4,601,447 | 7/1986 | McFarland | 248/49 |
| 4,614,321 | 9/1986 | Andre | 248/74.2 |
| 4,763,541 | 8/1988 | Spease | 74/501 R |
| 4,889,006 | 12/1989 | Kolinske et al. | 74/502.4 |
| 4,907,766 | 3/1990 | Rinderer | 248/57 |
| 4,951,524 | 8/1990 | Niskanen | 74/502.4 |
| 4,963,050 | 10/1990 | Wendt et al. | 74/502.4 |
| 5,010,781 | 4/1991 | Kirk et al. | 74/502.4 |
| 5,046,380 | 9/1991 | Matsumoto et al. | 74/502.4 |
| 5,086,662 | 2/1992 | Tayon et al. | 74/501.5 R |
| 5,105,682 | 4/1992 | Jung | 74/502.4 |
| 5,142,935 | 9/1992 | Carr | 74/502.6 |

FOREIGN PATENT DOCUMENTS

| | | | |
|---|---|---|---|
| 0223470 | 5/1987 | European Pat. Off. | 74/502.4 |
| 0239984 | 10/1987 | European Pat. Off. | 74/502.4 |

*Primary Examiner*—Vinh T. Luong
*Attorney, Agent, or Firm*—Barnes, Kisselle, Raisch, Choate, Whittemore & Hulbert

[57] ABSTRACT

A cable mounting construction comprising a bracket having a slot therein which has an open end, a closed end and sides, and a retainer assembly adapted to be snapped into position in the slot. The retainer assembly includes a one-piece generally tubular body having spaced flanges defining an annular groove. A snap spring includes a generally arcuate cylindrical portion and is snapped into the annular groove engaging the base of the groove. The snap ring includes free ends formed into tabs that extend generally radially such that when the retainer assembly is positioned in the slot the tabs flex and snap into recesses in the opposed sides of the slot. The retainer has an axial opening through which a cable may extend.

7 Claims, 2 Drawing Sheets

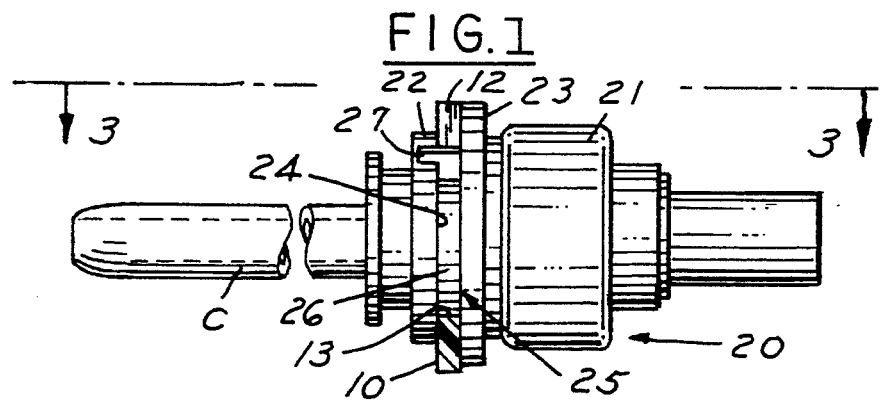
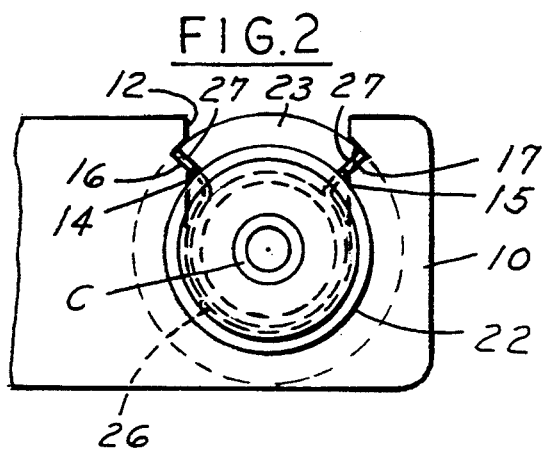
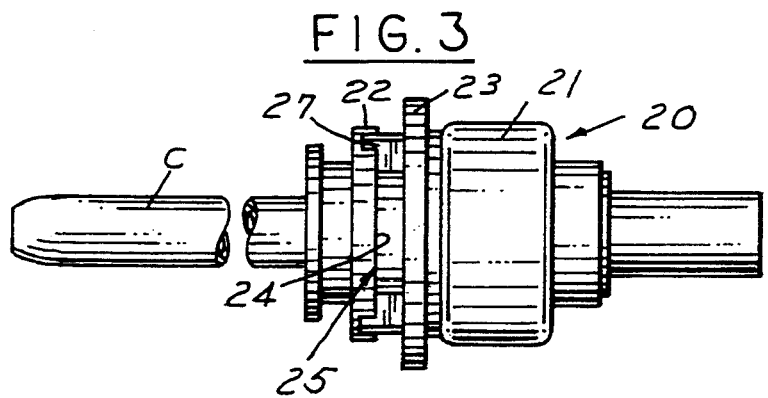
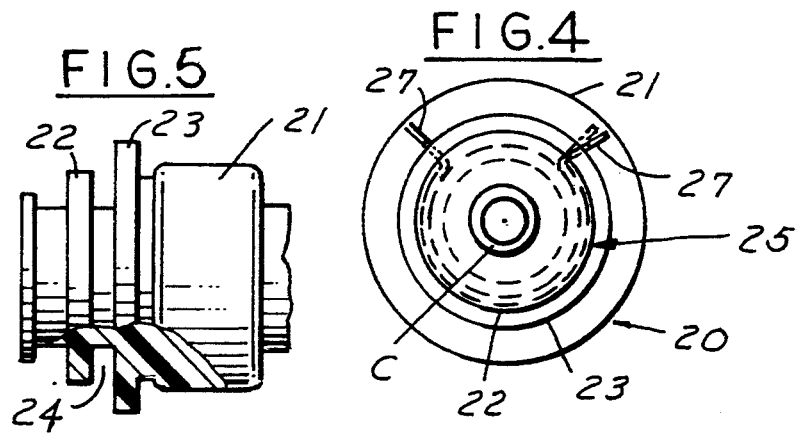

CABLE MOUNTING CONSTRUCTION

This invention relates to mounting constructions and particularly to cable mounting constructions.

BACKGROUND AND SUMMARY OF THE INVENTION

In the mounting of cables which comprises an outer member such as a conduit and an inner member such as a flexible strand, it is common to guide or hold portions of either or both of the members in position on a bracket. Typical prior patents showing such a construction are U.S. Pat. Nos. 3,885,767 and 4,339,213.

Among the problems that have been encountered in such mounting constructions is the inability to insure that the fitting supporting the cable component is in place. Another problem is that some constructions require the use of tools.

Other U.S. patents showing cable mounting constructions or the like are U.S. Pat. Nos. 2,543,997, 2,744,769, 2,744,776, 2,954,248, 3,229,026, 3,366,356, 3,885,767, 4,267,994, 4,601,447, 4,614,321, 4,763,541, 4,907,766, 4,951,524 and European patents 0 223 470 and 0 239 984.

Accordingly, among the objectives of the present invention are to provide a cable mounting construction which will function to manually hold a cable fitting on a bracket; which will permit mounting of adjacent cable components at the same location; which will result in the snapping of the fitting in position insuring proper mounting; wherein the proper mounting can be readily visually determined; and wherein the fitting is free to move about its axis.

In accordance with the invention, a cable mounting construction comprises a bracket having a slot therein which has an open end, a closed end and sides. A retainer assembly is inserted in the slot. The retainer assembly includes a one-piece generally tubular body having spaced flanges, defining an annular groove. A snap spring includes a generally arcuate cylindrical portion and is snapped into the annular groove engaging the base of the groove. The snap spring includes free ends formed into tabs that extend generally radially and are adapted to flex relative to the arcuate portion such that when the retainer assembly is positioned in the slot the tabs flex and snap into recesses in the opposed sides of the slot and produce an audible sound. As a result, the tabs are maintained under tension in the recesses and take up any tolerances between the snap spring and the recesses such that the retainer is held firmly against inadvertent removal. The retainer has an axial opening through which a cable may extend.

DESCRIPTION OF THE DRAWINGS

FIG. 1 is a fragmentary elevational view of a cable mounting construction embodying the invention.

FIG. 2 is an end view of the cable mounting construction taken from the left as viewed in FIG. 1.

FIG. 3 is a fragmentary plan view of the cable mounting construction.

FIG. 4 is a fragmentary end view of the retainer assembly utilized in the cable mounting construction.

FIG. 5 is a part sectional side elevational view of the retainer forming part of the retainer assembly.

DESCRIPTION

Figure 6:
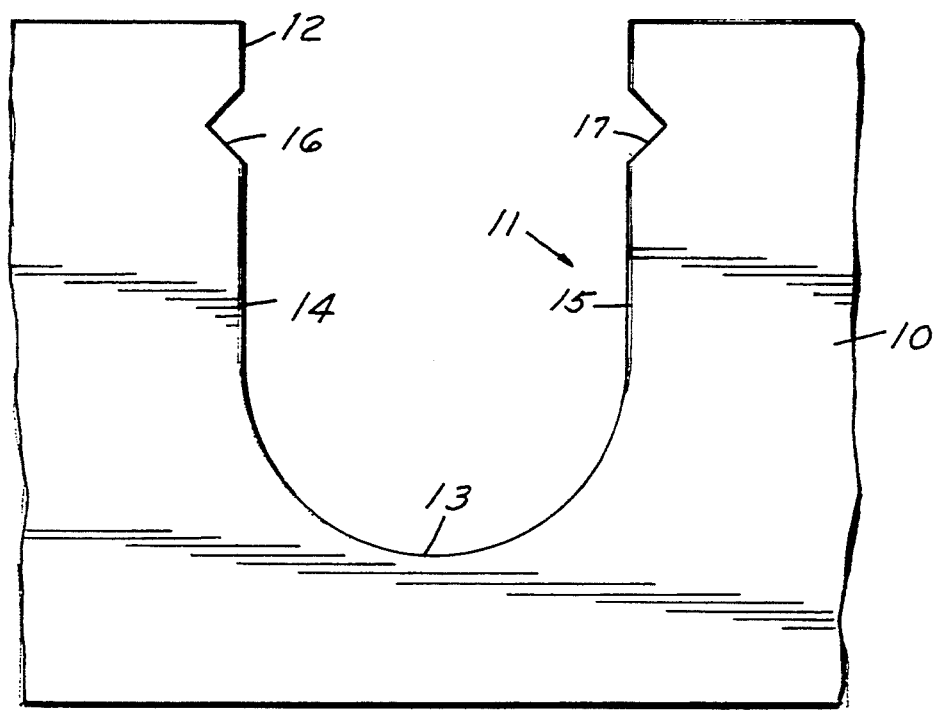
FIG. 6 is a fragmentary elevational view of a bracket forming part of the cable construction.

Referring to FIG. 6, the cable element mounting construction embodying the invention comprises a bracket 10 having a wall that includes a mounting slot 11 which has an open end 12, a semi-circular closed end 13, and straight parallel sides 14, 15. The retainer assembly 20 (FIGS. 1–4) includes a one-piece generally tubular plastic body 21 having spaced flanges 22, 23 defining an annular groove 24. A snap spring 25 (FIGS. 1–4 and 7–8) includes a generally cylindrical portion 26 and is snapped into the annular groove 24 engaging the base of the groove 24. The snap ring 25 includes free ends formed into tabs 27 that extend generally radially such that when the retainer assembly 20 is positioned in the slot 11 the tabs 27 snap into recesses 16, 17 in the opposed sides 14, 15 of the slot 11 to hold the retainer assembly 27 firmly in bracket 10. The retainer 20 has an axial opening 28 through which a cable C may extend.

In order to remove the retainer assembly 20, the tabs 27 are grasped and flexed toward one another to disengage the tabs 27 from the recesses 16, 17 permitting removal of the retainer assembly by movement axially outwardly of the slot 11.

Figure 7:
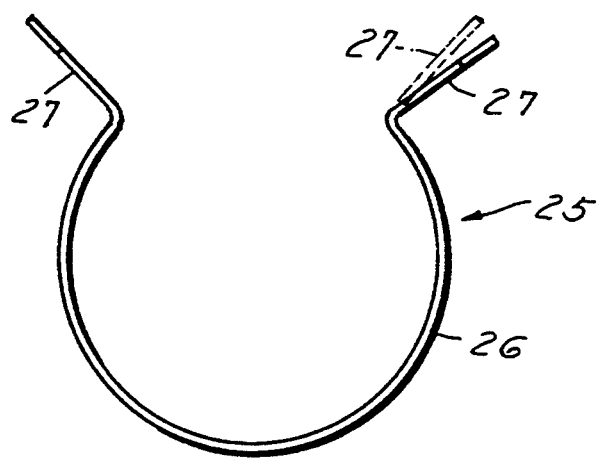
FIG. 7 is an end view of a snap ring forming part of the retainer assembly.
Figure 8:
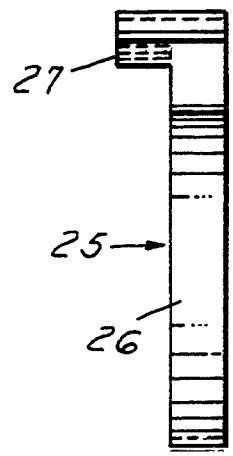
FIG. 8 is an end view of the snap ring shown in FIG. 7 taken from the right as viewed in FIG. 7.

As shown in FIG. 7, the snap ring 25 has the tabs 27 formed at an angle such that the tabs 27 can flex relative to the body portion 26 and remain flexed when placed under tension when engaging the recesses 16, 17. When assembled in the slot the retainer is rotatable relative to the bracket and the spring such that the conduit can assume its unobstructed position in the cable system. The tabs 27 further extend axially of the body portion 26 toward flange 22 so that they can be more readily grasped. Flange 22 has a lesser diameter than flange 23 to facilitate grasping the tabs 27. The body portion 26 has a width corresponding to the width of groove 24 in retainer body 21.

The retainer body 21 may be made of plastic or metal. When made of plastic, a glass reinforced nylon has been found to produce satisfactory results. The spring may be made of spring material such as spring steel.

It can thus be seen that there has been provided a cable mounting construction which will function to manually hold a cable fitting on a bracket; which will permit mounting of adjacent cable components at the same location; which will result in the snapping of the fitting in position insuring proper mounting; wherein the proper mounting can be readily visually determined; and wherein the fitting is free to move about its axis.

I claim:

1. A cable mounting construction that comprises:
   a cable retainer body having an axial through opening for receiving a cable, and an external surface with an annular groove having a radially facing groove base,
   a snap spring having an arcuate cylindrical portion received and retained by snap fit in said groove against said base, and a pair of angularly spaced flexible tabs that extend radially outwardly from opposed ends of said arcuate cylindrical portion, and
   a bracket having a slot with an open end, a closed end received in said annular groove externally of said arcuate cylindrical portion of said spring, and opposed sides having recesses in which said flexible tabs are received and retained by snap fit.

2. The construction set forth in claim 1 wherein said tabs have portions that extend axially from said snap spring for manually grasping and flexing said tabs toward each other to release said tabs for said recesses so that said retainer body and said snap spring retained thereon are slidable as a unit out of said bracket slot.

3. The construction set forth in claim 2 wherein said annular groove on said external surface is defined by a pair of spaced flanges that extend from said body, said axially extending portions of said tabs being disposed radially outwardly of one of said flanges.

4. The construction set forth in claim 3 wherein said one of said flanges is of lesser diameter than the other of said flanges.

5. The construction set forth in claims 1, 2 or 3 wherein said arcuate cylindrical portion of said snap spring has a width substantially equal to that of said groove in said retainer body.

6. The construction set forth in claims 1, 2 or 3 wherein said retainer body is of plastic construction.

7. The construction set forth in claims 1, 2 or 3 wherein said retainer body is rotatable within said snap spring and said bracket.

* * * * *